United States Patent [19]

Dandrea

[11] 4,337,693
[45] Jul. 6, 1982

[54] PEPPER CORING AND SLICING APPARATUS

[75] Inventor: Peter L. Dandrea, Landisville, N.J.

[73] Assignee: Garden Green Vegetable Processors, Inc., Landisville, N.J.

[21] Appl. No.: 211,328

[22] Filed: Nov. 26, 1980

[51] Int. Cl.³ .......................... A23N 4/12; A23N 4/22
[52] U.S. Cl. ...................................... 99/491; 99/492; 99/545; 99/552
[58] Field of Search .......................... 99/486, 489–492, 99/494, 514, 537, 547, 542–545, 549, 564, 552–555, 564, 635, 637, 642, 643

[56] References Cited

U.S. PATENT DOCUMENTS

| | | | |
|---|---|---|---|
| 2,437,637 | 3/1948 | Bridge | 99/545 |
| 2,835,294 | 5/1958 | Rigney | 99/544 |
| 3,830,151 | 8/1974 | Gerson | 99/537 |
| 4,090,439 | 5/1978 | Chall et al. | 99/549 |
| 4,112,837 | 9/1978 | Altman et al. | 99/537 |
| 4,252,056 | 2/1981 | Altman | 99/544 |

*Primary Examiner*—Philip R. Coe
*Assistant Examiner*—Timothy F. Simone
*Attorney, Agent, or Firm*—Walter B. Udell

[57] ABSTRACT

Pepper coring and slicing apparatus including a conveyor having individual pepper holding devices for holding peppers with the stem portion upward, a processing station for coring and splitting the peppers, and a discharge station where the peppers are ejected from the pepper holders and dropped onto a conveyor for further processing. The conveyor includes a pair of adjacent plates for holding each pepper by means of a resilient rubber structure half of which is carried on each plate of the pair and between which the pepper is disposable with the bottom of the pepper seated in an opening between the two plates. When the conveyor moves the pepper into the processing station, a pair of side cutting blades and a corer descend from above to core the pepper and slice through the pepper sides while a second slicing knife rises from below through the hole between the conveyor plates and cuts the center of the pepper beneath the core. The core is stripped from the corer and remains with the pepper. At the discharge station, as the conveyor moves around a sprocket, the plates on which the pepper is being carried are rotated angularly outward away from one another to release the pepper from the resilient retainers. The timing sequence of the apparatus is such that when the conveyor is moving a pepper into the coring and slicing station, the coring and slicing knives are retracted and disabled, and when the coring and slicing knives are actuated to core and slice the pepper, the pepper moving conveyor is disabled.

20 Claims, 13 Drawing Figures

PEPPER CORING AND SLICING APPARATUS

This invention relates to vegetable processing apparatus, and more particularly relates to an apparatus for coring and slicing peppers. The apparatus includes a conveyor having individual pepper holding devices into which the peppers are placed by an operator with the stem portion upward, a processing station for coring and splitting the peppers, and a discharge station where the peppers are ejected from the pepper holders and dropped onto a conveyor for further processing.

Basically, the conveyor includes a pair of adjacent plates for holding each pepper by means of a resilient rubber structure half of which is carried on each plate of the pair and between which the pepper is disposable with the bottom of the pepper seated in an opening between the two plates. When the conveyor moves the pepper into the processing station, a pair of side cutting blades and a corer descend from above to core the pepper and slice through the pepper sides while a second slicing knife rises from below through the hole between the conveyor plates and cuts the center of the pepper beneath the core. The core, although severed from the pepper, is stripped from the corer and remains with the pepper, and the conveyor then takes the pepper to a discharge station. At the discharge station, as the conveyor moves around a sprocket, the plates on which the pepper is being carried are rotated angularly outward away from one another to release the pepper from the resilient retainers. The timing sequence of the apparatus is such that when the conveyor is moving a pepper into the coring and slicing station, the coring and slicing knives are disabled, and when the coring and slicing knives are actuated to core and slice the pepper, the pepper moving conveyor is disabled so that the peppers are standing motionless at the processing station.

In the past, there have been devised processing machines for cutting and pitting fruit and for slicing and coring peppers as well. However, these earlier devices have generally suffered from various drawbacks. The fruit pitting apparatus is unsuitable for use with the processing of peppers, and the known pepper coring and slicing devices have utilized other means for carrying out their purpose. For example, some devices have used high speed rotating disc slicers which pose a potential safety hazard. In other cases, the pepper processing apparatus has cored the peppers by taking a coring cut completely through the pepper from top to bottom, thereby cutting a substantial plug of usable pepper from the bottom of the pepper. This process wastes approximately fifteen percent of the pepper body and also makes the processed pepper unusable as a shell for stuffed peppers for the portion-prepared frozen food market. The apparatus according to the invention cores and slices the pepper without wasting any of the usable body of the pepper and may be used to process a large number of peppers simultaneously. The invention will be illustrated in the appended drawings as processing eight peppers simultaneously in an arrangement of four peppers in a linear sequence in two side by side rows. A longer linear sequence could if desired be utilized, as well as many more parallel rows of peppers.

It is a primary object of the invention to provide a novel pepper coring and slicing apparatus suitable for coring and slicing peppers in half in a quick and efficient manner which retains all of the usable body of the pepper.

Another object of the invention is to provide a novel pepper coring and slicing apparatus as aforesaid which utilizes vertically reciprocating slicing and coring knives to core and slice the peppers being processed.

A further object of the invention is to provide a novel coring and slicing apparatus as aforesaid for processing peppers in which the cutting and coring knives are only actuated when the pepper carrying conveyor is halted, and which includes safety lock-out devices to prevent movement of the pepper conveyor if the processing knives are not in their fully retracted and out of the way positions.

Yet another object of the invention is to provide a novel pepper coring and slicing apparatus as aforesaid which includes a novel mechanism for discharging the processed peppers from the conveyor carrying them.

The foregoing and other objects of the invention will become clear from a reading of the following specification in conjunction with an examination of the appended drawings, wherein:

FIG. 8 is a fragmentary view showing the slicing and coring of a pepper;

FIG. 9 illustrates a cored and sliced pepper;

In the several figures, like elements are denoted by like reference characters.

Figure 1:
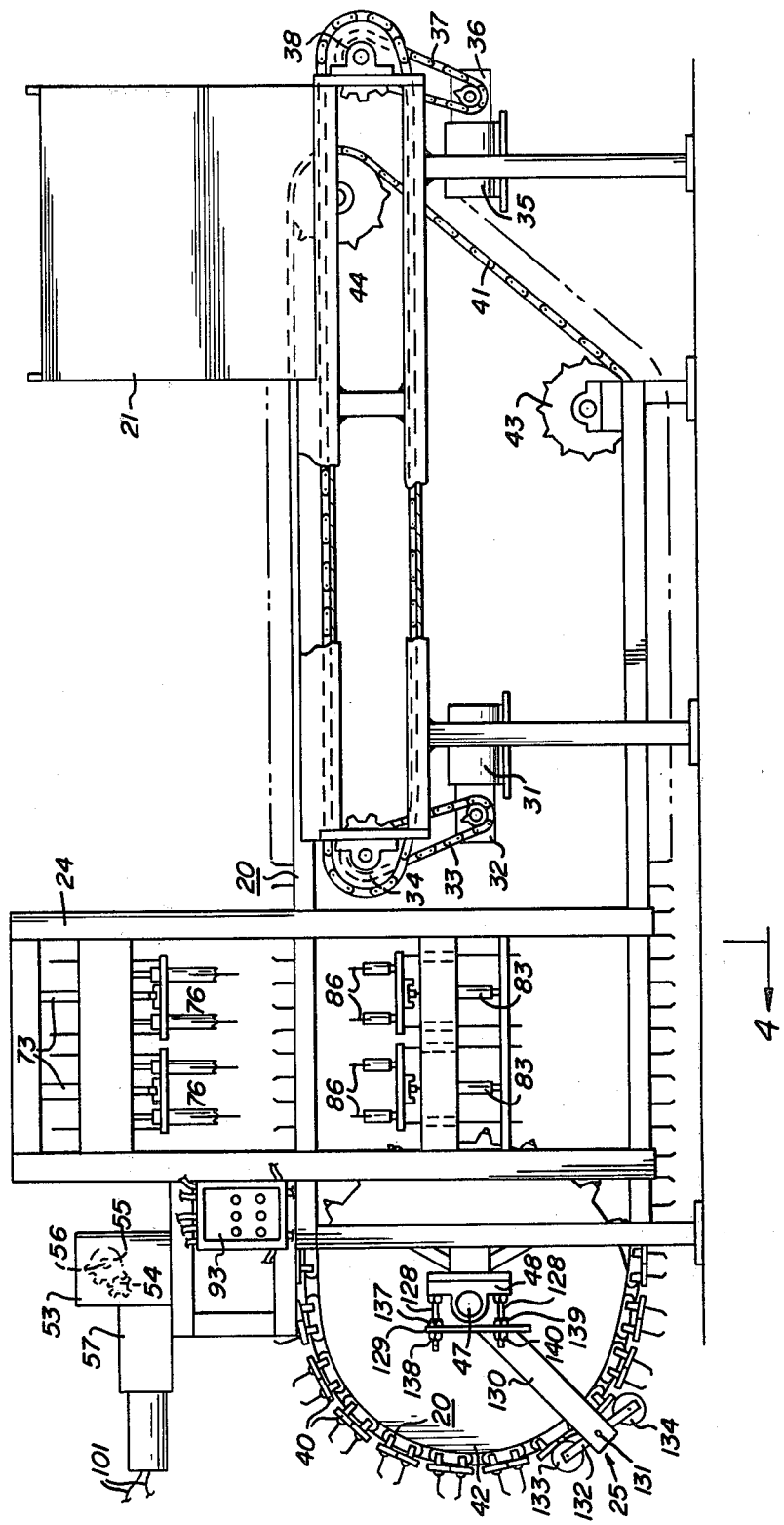
FIG. 1 is a side elevational view of the pepper coring and slicing apparatus according to the invention.
Figure 2:
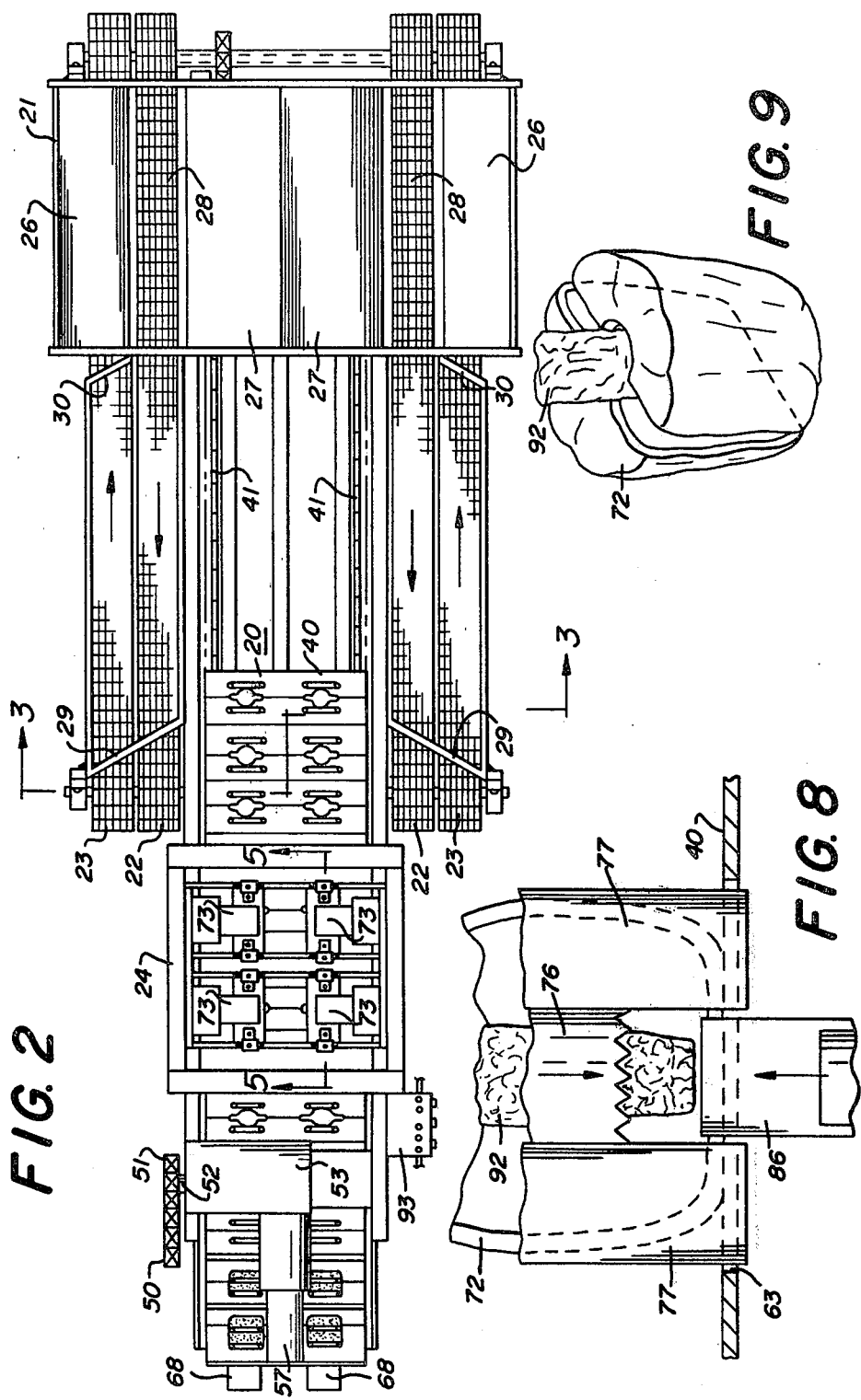
FIG. 2 is a top view of the apparatus seen in FIG. 1.
Figure 3:
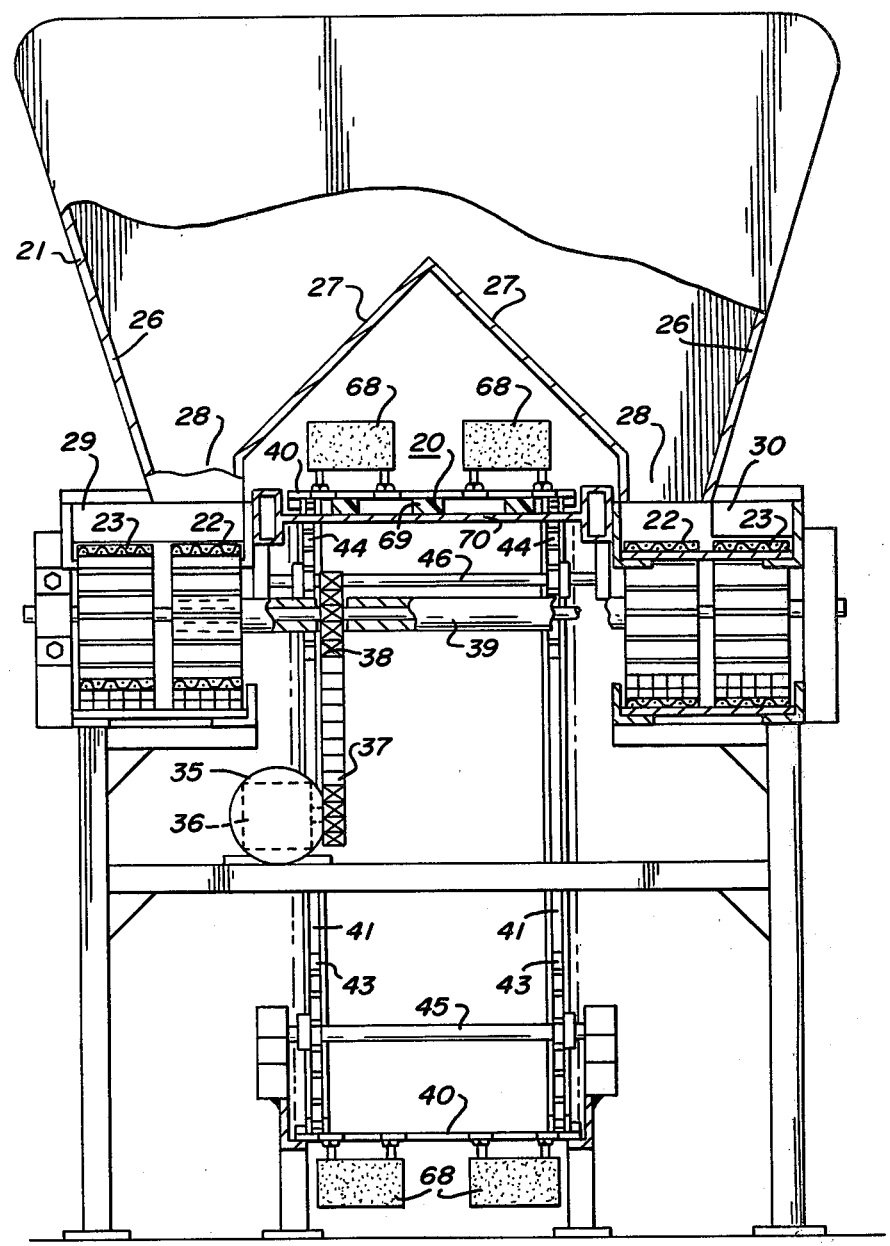
FIG. 3 is a vertical jump section transverse to the pepper conveyors looking toward the pepper feeding hopper end of the apparatus as would be seen when viewed along the line 3—3 of FIG. 2.

Considering first the FIGS. 1, 2 and 3 of the drawings, there is seen a main conveyor 20 for carrying the peppers to be processed from a hopper 21 via forward and return conveyors 22 and 23 respectively to a processing station 24 where the peppers are cored and sliced, and finally to a discharge station 25 where the processed peppers are discharged from the conveyor 20.

As best seen from FIGS. 2 and 3, the hopper 21 has a pair of outside sidewalls 26 which together with a pair of interiorly upwardly converging walls 27 form a pair of discharge slots 28 which open downward onto the upper flights of the forward conveyors 22 so that peppers poured into the hopper 21 will be continuously fed onto the forward conveyors 22. Personnel standing on opposite sides of the apparatus pick the peppers off of the forward conveyors 22 and place them in the pepper holders of the conveyor 20. However, those peppers which have not been so placed by the time they arrive at the forward end of the forward conveyors 22 are deflected by deflectors 29 outward onto the return conveyors 23 and return rearward toward the hopper 21. These rearwardly returning peppers at the front end of the hopper 21 are deflected by means of the deflectors 30 back onto the forward conveyors 22, and again move forward.

As best seen in FIG. 1, the forward conveyors 22 are driven by an electric motor 31 through a gear box 32, chain 33 and sprocket 34. Similarly, the return conveyors 23, as best seen in FIGS. 1 and 3, are driven by an electric motor 35 through a gear box 36, chain 37 and sprocket 38. The sprocket 38 is mounted on a shaft 39 which extends in opposite directions transversely to the conveyor system to simultaneously drive both of the return conveyors 23. In like fashion, the sprocket 34 is mounted on a transverse shaft, not shown, which connects to and simultaneously drives the forward conveyors 22.

The main conveyor 20, as best seen in FIGS. 1, 2, 3, 6 and 7 consists of a number of conveyor plates 40 all of which are secured at their opposite ends to links of sprocket chains 41. The sprocket chains 41 are trained in an endless loop about the main large drive gears 42 at the discharge end of the apparatus, and at the lower and upper runs of the conveyor at the feed end about idler gears 43 and 44 respectively carried on shafts 45 and 46. The main drive gears 42 are carried on opposite ends of a shaft 47 carried by bearings 48 which are fixedly secured to the machine frame.

Figure 4:
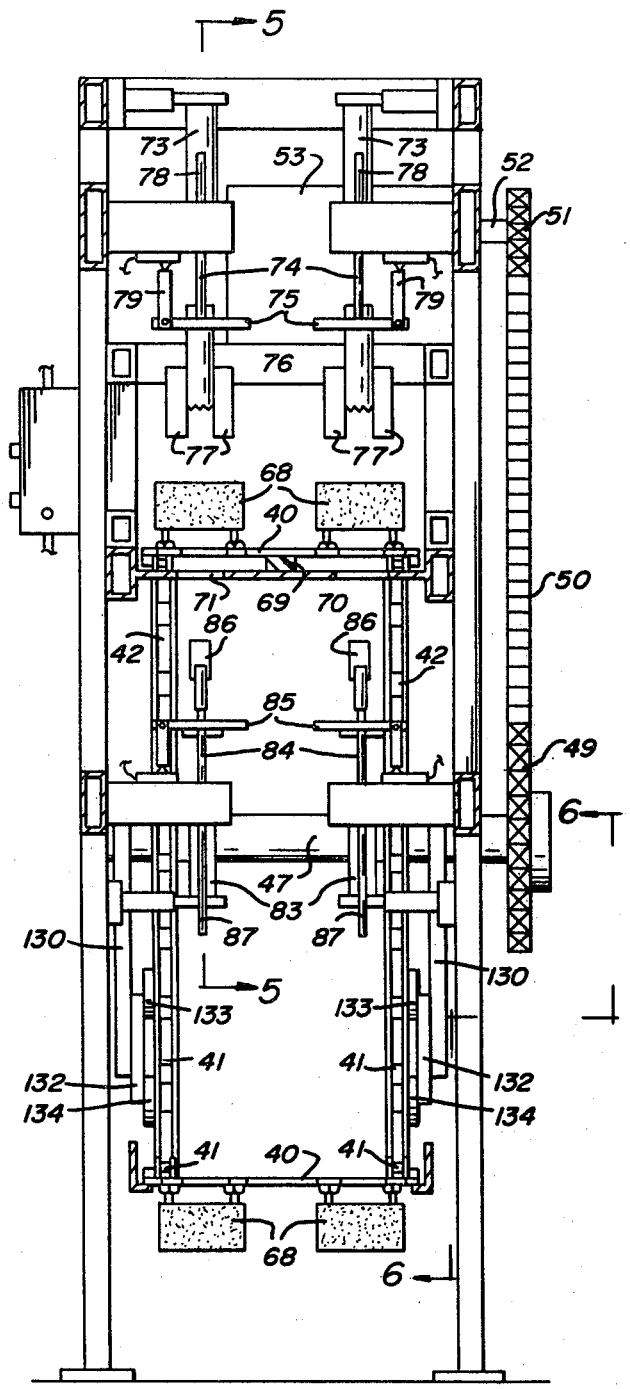
FIG. 4 is a vertical cross-section transverse to the conveyors looking toward the coring and slicing station of the apparatus as would be seen when viewed on the line 4—4 of FIG. 1.
Figure 11:
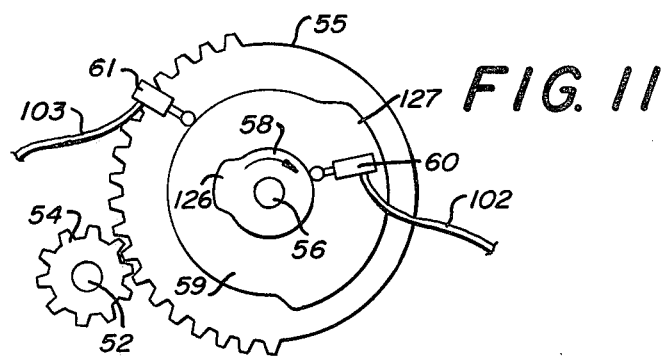
FIG. 11 is an enlarged detail view of the pepper conveyor gear drive and synchronized controls for the pepper cutters.

As best seen in FIG. 4, one end of main drive gear shaft 47 has fixed thereon a sprocket 49 about which is trained a sprocket chain 50 which extends upward and is trained about a driving sprocket 51 fixed upon a shaft 52 which extends to the left into a gear box 53. The opposite end of shaft 52 terminates within the gear box 53 in a pinion gear 54 as best seen in FIGS. 1 and 11. Within the gear box 53 and engaged with the pinion gear 54 is a sector gear 55 mounted upon a shaft 56 which is driven at an appropriate speed through the gearing box 53 from the main drive motor 57.

When the main drive motor 57 has been energized the sector gear 55 rotates continuously and drives the pinion gear 54 during that portion of its revolution, approximately fifty percent, when the teeth of the sector gear 55 are engaged with the teeth of the pinion gear 54. When the sector gear teeth disengage from the pinion gear 54, the pinion gear stops rotating, and hence the main conveyor 20 stops moving. The conveyor 20 remains stopped until the sector gear completes the other half of its rotation during which it has no teeth engaged with the pinion gear 54. It is during this time interval when the main conveyor 20 is in its stopped condition that the coring and slicing of the peppers at the processing station takes place. This is carried out, as will be subsequently described, through the agency of the cams 58 and 59 actuating the switches 60 and 61. The cams 58 and 59 are secured with the sector gear 55 upon the shaft 56 so that the relationship of the cams to the sector gear remains fixed.

Figure 6:
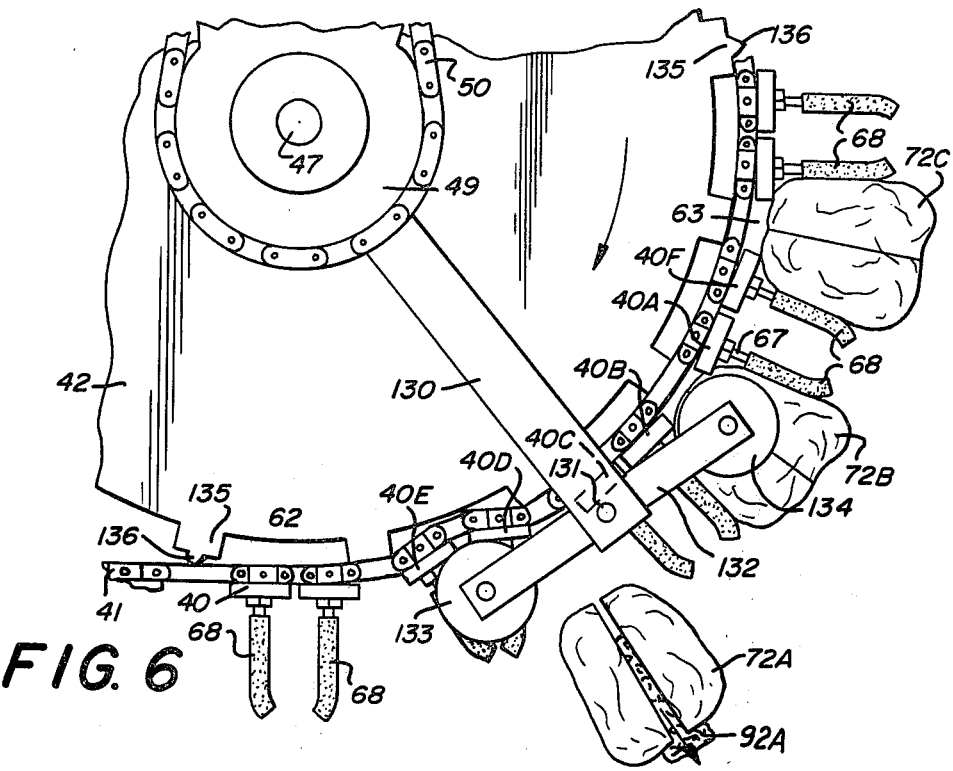
FIG. 6 is an enlarged fragmentary side view at the discharge end of the conveyor illustrating the discharge of a processed pepper.
Figure 7:
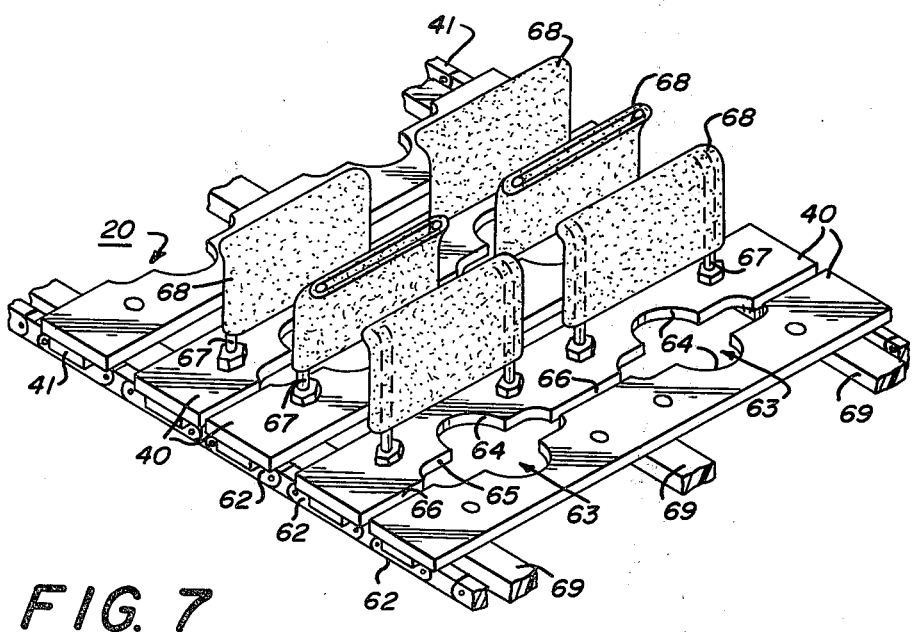
FIG. 7 is an enlarged fragmentary perspective view of the pepper holding conveyor.

The details of the pepper holding conveyor itself are best seen from the showing of FIG. 7, to which attention should be now directed. The conveyor plates 40 are each secured at opposite ends to links 62 of the conveyor sprocket chain 41, this separate link mounting for each conveyor plate 40 rendering it individually pivotable with regard to the plane of the adjacent conveyor plate 40, as best seen in the showing of FIG. 6. The plates 40 are identical, a pair of plates being reversed end for end with respect to one another to define the rounded ends cross-shaped openings 63 within which the base of each pepper carried by the conveyor is disposed. The rounded end cross-shaped opening is formed by the opposite facing arcuate edges 64 and by the arcuate edges 65 which extend from one end of the arcuate edge 64 to one of the widthwise extending edges 66 of each conveyor plate 40.

The facing arcuate edges 65 define an opening extending widthwise of the conveyor through which pepper slicing knives are downwardly projected to slice the sides and part of the bottom of a pepper. The central region of the rounded ends cross-shaped openings 63 provide an opening through which a pepper slicing knife is upwardly projected to slice the center of the bottom of the pepper. Fixedly secured to each of the plates 40 are pairs of upwardly extending posts 67 having upper ends bent away from the vertical and in a direction extending longitudinally of the conveyor run. Each pair of adjacent posts on a conveyor plate 40 is provided with a rubber sleeve 68, which together with the rubber sleeve 68 which faces it across one of the rounded ends cross-shaped openings 63 constitute a resilient pepper holder. A pepper is pressed downward between the facing rubber sleeves 68 until its bottom seats in the opening 63, as is clearly seen in the showings of FIGS. 5 and 6.

FIG. 7 illustrates a conveyor having plates 40 with two widthwise extending pepper holding stations, but the conveyor plates 40 could if desired be made longer to increase the number of widthwise extending pepper holding stations. The upper flight of the conveyor 20 is seated upon and rides along a plurality of low friction nylon rails 69 which are supported by an underlying steel support structure 70, which latter is suitably apertured in the region of the processing station 24, as best seen at 71 in FIGS. 4 and 5.

Figure 5:
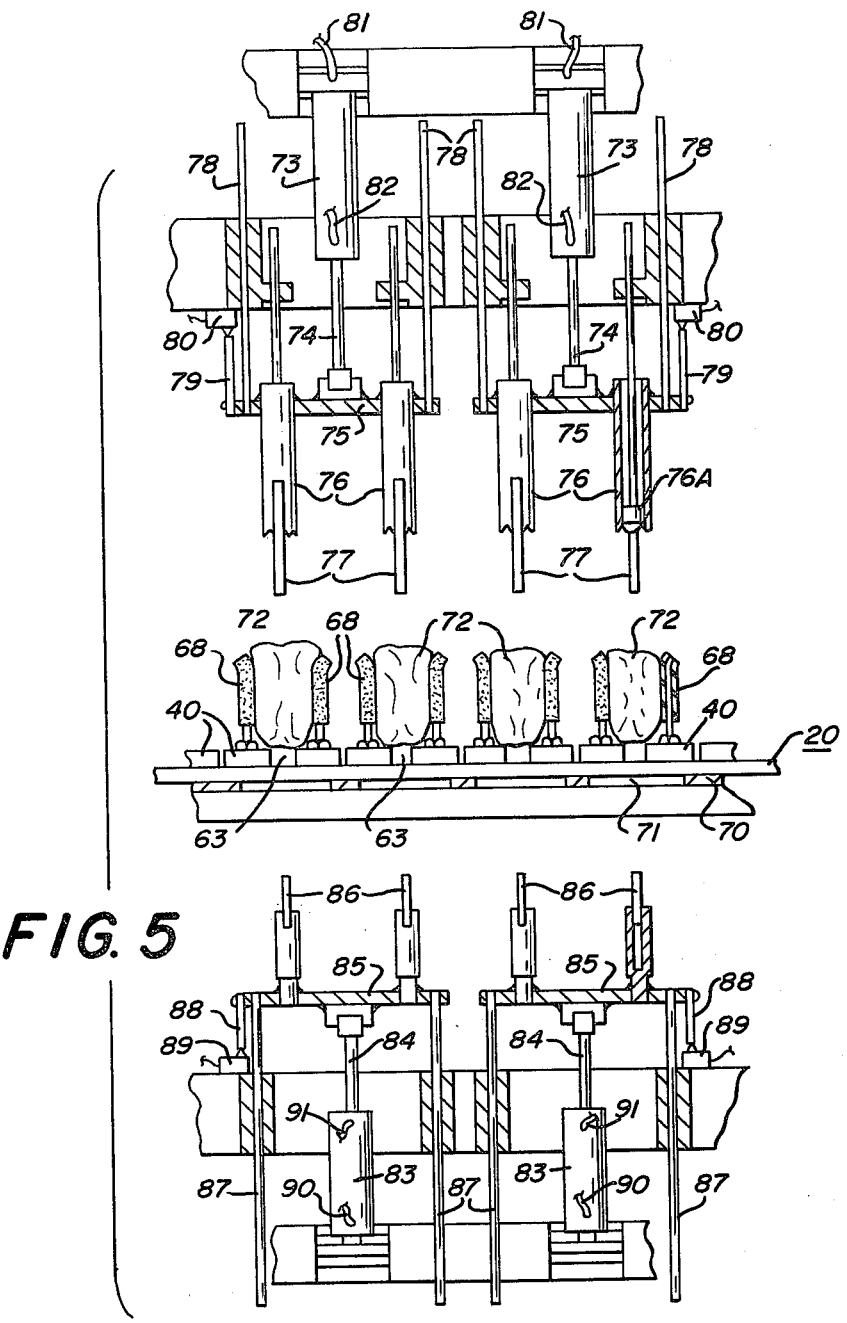
FIG. 5 is a vertical longitudinal cross-sectional fragmentary view through the coring and slicing station of the apparatus as would be seen when viewed along the lines 5—5 of FIG. 2 and FIG. 4.

Considering now the pepper coring and slicing process, attention should be directed toward FIGS. 1, 2, 4, 5, 8 and 9. As best seen in FIG. 5, a group of peppers 72 is positioned at the processing station to be cored and sliced. Four peppers are shown in FIG. 5, but from FIGS. 2 and 4 it is observed that the conveyor is a dual flight conveyor so that it is to be understood that there are four additional peppers also present on the other conveyor flight. Secured to the upper part of the machine frame are four double acting pneumatic cylinders 73 each of which has a downwardly extending piston rod 74 to the lower end of which is fixed a plate 75 to which are secured a pair of coring and slicing knives each of which includes a corer 76 and a pair of in-plane spaced apart slicing knives 77.

Secured to the outer ends of the plates 75 are guide rods 78 which extend close fittingly through cylindrical bores in a portion of the main frame to guide and stabilize the plate 75 as it vertically reciprocates when the pneumatic cylinders 73 are actuated. Also affixed to each knife carrying plate 75 is a switch actuating rod 79, the upper end of which, as shown in FIGS. 4 and 5, engage the contacts of safety circuit micro-switches 80 and cause those switches to be in their closed condition when the upper cutting knives are in their upwardly retracted position. The upper cutting and coring knives are driven vertically downward to partially cut and to core the underlying stopped peppers when the pistons 74 of the pneumatic cylinders 73 are driven downward by the injection of pressurized air through the pneumatic hose connections 81 at the upper ends of the cylinders 73. The cutting and coring knives are subsequently retracted by release of the pneumatic pressure in the lines 81 and application of pneumatic pressure to the cylinders 73 through the lower hoses 82.

Positioned beneath the conveyor 20 at the processing station is another set of pneumatic cylinders and cutting knives arranged similarly to those just described. The cylinders 83 are fitted with upwardly extending piston rods 84 fixed at their upper ends to knife carrying plates 85 to which are affixed lower slicing knives having blades 86. Guide rods 87 and switch actuating rods 88 are also fixed to the knife plates 85, with the rods 88 actuating micro-switches 89 in the same manner as the micro-switches 80 are actuated. Secured to the pneumatic cylinders 83 are pneumatic hoses 90 and 91 which function respectively in the same manner as pneumatic hoses 81 and 82.

As shown in FIG. 5, the corers 76 are of hollow cylindrical shape having serrated cutting edges at their lower ends, each having disposed within the hollow interior of the corer a stripper 76A. One end of each stripper is secured to the frame of the machine so that the stripper remains fixed in position when the associated corer 76 reciprocates vertically downward and upward. When the corer 76 descends to cut out the pepper core, the core is frictionally retained within the corer and rises with it until the upper end of the corer strikes the lower end of the stripper 76A which then ejects the core from the corer 76 as the latter continues to rise vertically. This action causes the core to fall back downward into the pepper from which is had just been cut.

The coring and slicing of the peppers is best seen in FIGS. 8 and 9 from which it is observed that the corer 76 and side slicers 77 have descended to cut through the tops, sides and part of the bottom of each pepper 72 and to also circularly cut out the pepper core 92, the side slicers 77 passing downward through the plane of the cross-shaped opening 63 in the conveyor plate 40. Simultaneously, the lower cutting knives 86 have risen, passing through the cross-shaped openings 63 in the conveyor plates 40 to sever the remaining central portion of the bottom of each pepper 72. Thereafter, when the knives 77 and the corer 76 are retracted upward while the lower knife 86 is retracted downward, there results the cored and severed peppers as shown in FIG. 9. This pepper is of course still retained within the pepper holder and is moved out of the processing station when the conveyor 20 is again started up. The sliced and cored pepper, held together as a unit, is then moved to and discharged from the conveyor at the discharge station to be subsequently described.

Figure 10:
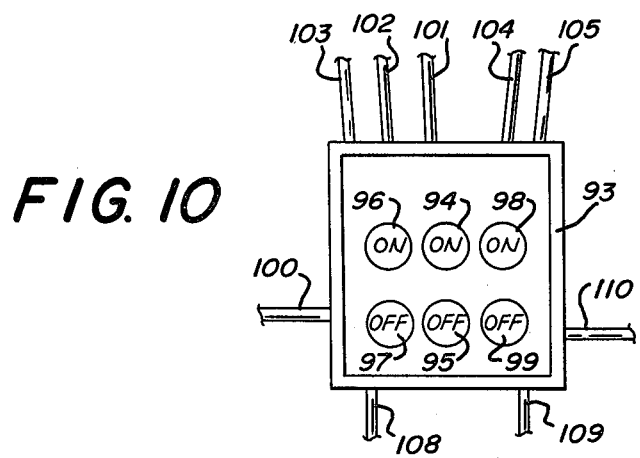
FIG. 10 illustrates the power control box for the apparatus.

The actual sequential operation of the apparatus is best understood by referring to FIGS. 10 through 13. FIG. 10 shows the power control box 93 which is mounted on one side of the apparatus immediately to the left of the processing station 24, as best seen in FIGS. 1 and 2. The power control box is provided with a main power switch having an "ON" or "START" button 94 and an "OFF" or "STOP" button 95, "START" and "STOP" buttons 96 and 97 for the forward conveyor motor 31, and "START" and "STOP" buttons 98 and 99 for rearward conveyor motor 35. Input power to the control box 93 is supplied via input cable 100, and power out of the control box to the main drive motor 57 is carried by conductor 101.

Figure 12:
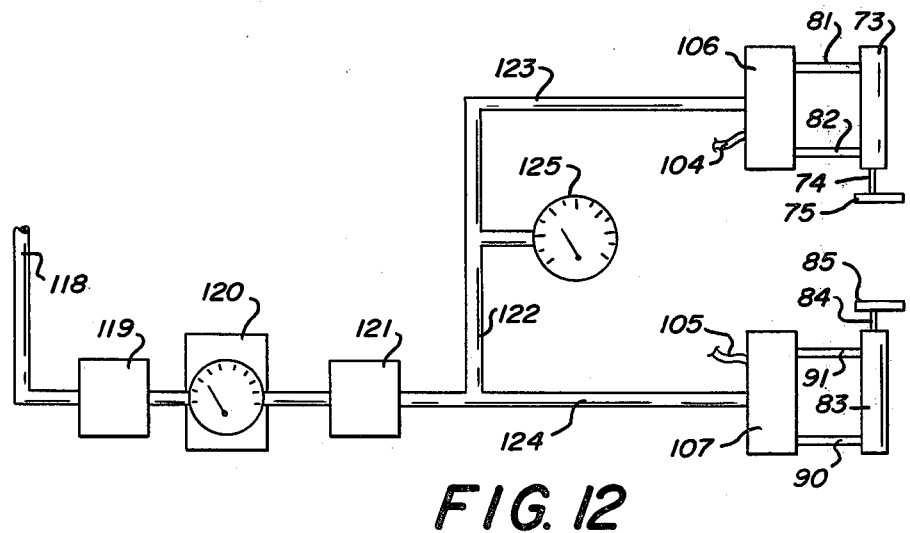
FIG. 12 is a schematic diagram of the pneumatic circuit for the apparatus.

The cam switches 60 and 61 shown in FIG. 11 connect to the control box 93 via cables 102 and 103. Cam switch 60 actuates and deactuates the solenoid valves which control the pneumatic cylinders via cables 104 and 105 while cam switch 61 provides a holding function for relay 111 when micro-switches 80 and 89 are normally open. The solenoid valves which control the pneumatic cylinders are shown in FIG. 12 and designated as 106 and 107, solenoid valve 106 controlling the operation of the upper pneumatic cylinders 73 while solenoid valve 107 controls the actuation of the lower pneumatic cylinders 83. The lower cables 108 and 109 respectively energize and deenergize the forward and rearward conveyor motors 31 and 35 under control of the push button switches 96 through 99. Finally, cable 110 from power control box 93 connects the upper and lower micro-switches 80 and 89 associated with the upper and lower pneumatic cylinders 73 and 83 to the circuitry within the control box.

Figure 13:
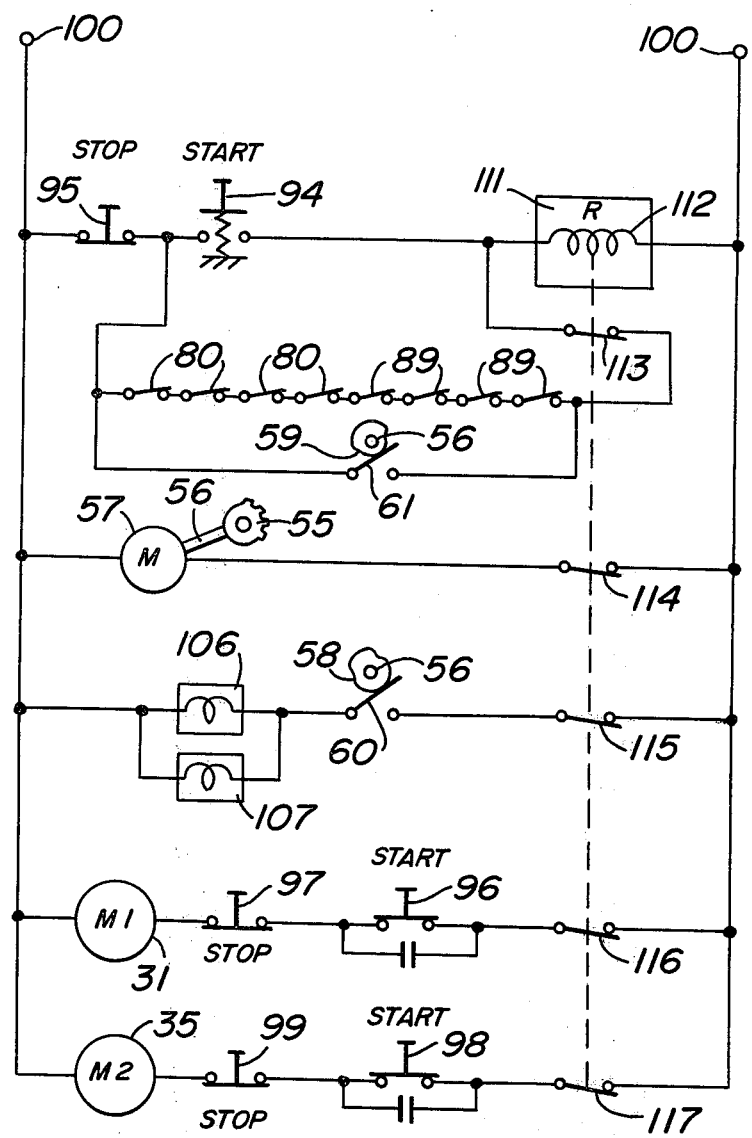
FIG. 13 is a schematic diagram of the electrical circuit for the apparatus.

Also contained within the control box 93 is a relay 111 shown in the electrical schematic diagram of FIG. 13, the relay having an energizing coil 112 and five normally open switch contacts 113 through 117. The relay contacts 113 through 117 are pulled into their closed switch position by energization of coil 112 of the relay 111 when START switch 94 is closed by pressing inward on the START button. The START button switch is spring loaded so that it makes momentarily and then releases. Closure of the START switch 94 also shifts the STOP switch 95 into a closed condition and allows current from the input power line 100 to flow through the switches and through the coil 112 of relay 111, thereby pulling the switches 113 through 117 into their closed condition. When switch 113 closes, an auxiliary holding current path is established through STOP switch 95 and the micro-switches 80 and 89 through the relay coil 112.

Release of the START switch 94 does not interrupt the current through the relay 111 because of the holding circuit which has been established through the switch contacts 113. This holding circuit for relay 111 is only established if all of the micro-switches 80 and 89 are closed. Consequently, all of the pneumatic cylinders must be in their completely retracted position. If they are not, the holding circuit cannot be made and release of the START switch button will interrupt power to the relay 111 and all of the switch contacts 113 through 117 will drop out of their open position. Since power to all of the remaining circuits passes through the contact switches of relay 111, no power can be supplied to the apparatus. Thus, the micro-switches 80 and 89 function as a safety circuit to prevent movement of the conveyor if the cutting knives are not retracted.

Assuming that power has been established and that all of the relay switches are closed as shown in FIG. 13, it is observed that power is supplied to the main motor 57 so that it begins to drive sector gear 55 through shaft 56. As also shown in FIG. 13, the solenoid valves 106 and 107 are not actuated even though relay switch 115 is closed because cam actuated switch 60 is in an open state. Forward and return conveyors 22 and 23 may be actuated by actuation of the START switches 96 and 98 to energize the conveyor motors 31 and 35, and this condition is illustrated in FIG. 13.

Before describing the cyclic operation of the apparatus, attention should be directed to FIG. 12 which illustrates the pneumatic circuit of the machine. A source of pressurized air is supplied through conduit 118, air filter 119, pressure regulator 120 and oiler 121 to a manifold 122 which distributes the pressurized air via conduits 123 and 124 to solenoid valves 106 and 107. The pressure in manifold 122 is monitored by a pressure meter 125.

Considering now FIGS. 5, 8 and 11 through 13, it is observed from FIG. 5 that a linear sequence of four peppers are positioned at the processing station at a given time for processing. This is arranged by designing the gearing ratios between pinion gear 54 and sector gear 55 on the one hand and gears 49 and 51 on the other hand, together with the internal gearing ratios of the gear box 53, so that the region of gearing engagement between sector gear 55 and pinion gear 54 corresponds to an advance of the conveyor 20 of a linear length of four pepper holders. During the remaining portion of the revolution of sector gear 55 in which there are no teeth engaged with pinion gear 54, the conveyor 20 stands motionless, and it is during this time interval that the coring and slicing operation takes place.

From FIG. 11 it is observed that while the pinion gear 54 is being driven, the micro-switch 60 and micro-switch 61 are in their open switch conditions because they are not engaged with the switch actuator segments 126 and 127 of the cams 58 and 59. This open switch condition is also shown in the schematic diagram of FIG. 13. Just after the pinion gear 54 has run out of tooth engagement with the sector gear 55 so that the conveyor has stopped, switch 61 rides up onto actuator segment 127 thereby closing the switch 61 and providing a circuit continuity bypass across the micro-switches 80 and 89 to maintain the holding current circuit through the relay 111.

As soon as micro-switch 61 has closed and stabilized, micro-switch 60 rides up onto the actuator segment 126 of cam 58, thereby closing switch 60 and energizing the solenoid valves 106 and 107. This causes pneumatic pressure to be applied to pneumatic cylinders 73 and 83 through the lines 81 and 90 to thereby drive the corers 76 and slicers 77 downward while simultaneously driving the lower knife blades 86 upward to core and cut the peppers standing motionless at the processing station. Actuation of the pneumatic cylinders 73 and 83 causes the micro-switches 80 and 89 to open, but this does not deenergize the relay 111 because holding current is provided by the bypassing switch 61. Continued rotation of the sector gear 55 then causes micro-switch 60 to run down off of the actuator segment 126 and open, thereby deenergizing the solenoid valves 106 and 107 and switching pneumatic pressure to airlines 82 and 91 which causes retraction of the pistons of pneumatic cylinders 73 and 83, carrying the coring and cutting knives with them.

Full retraction of the pneumatic cylinder pistons causes the switch actuating rods 79 and 88 to engage the micro-switches 80 and 89 and reclose them. When now the actuator segment 127 of cam 59 rotates out of engagement with micro-switch 61, thereby opening the switch 61, the holding circuit for relay 111 has already been reestablished through the micro-switches 80 and 89 and the relay remains energized. The opening of switch 61 occurs prior to reengagement of the teeth of sector gear 55 with the teeth of pinion gear 54 so that at this time the conveyor 20 has not again restarted.

Should any of the micro-switches 80 and 89 not have been reclosed due to a failure of any pneumatic cylinder to completely retract, when micro-switch 61 opens, the holding circuit through relay 111 will be broken and all of the contacts 113 through 117 will drop out and interrupt power to the entire apparatus. Consequently, main drive motor 57 will be deenergized and cannot drive sector gear 55 so that the sector gear teeth will not engage the teeth of pinion gear 54 and the conveyor 20 will remain motionless. Assuming of course that there is no failure in the micro-switch 80 and 89 circuits, the teeth of the sector gear 55 will engage the pinion gear 54 and the conveyor will move forward another four pepper positions so that four new peppers are now positioned at the processing station 24 when pinion gear 54 again disengages from the teeth of sector gear 55. The foregoing described process is then repeated continuously as long as the apparatus is energized.

Considering now the discharge of the cored and sliced peppers from the apparatus, reference should be made to FIGS. 1, 4 and 6. As best seen in FIG. 1, the bearings 48, one on each side of the apparatus, have fixedly secured thereto and extending to the left thereof a pair of threaded rods 128 upon which is adjustably mounted a support plate 129 to which is fixedly secured and depending downward and to the left an arm 130. It is of course understood that the structure shown in FIG. 1 is duplicated on the other side of the machine as appears best from FIG. 4. Pivotally secured to the lower end of the fixed arm 130 at pivot 131 is a rocker arm 132 having rotatably secured at each end thereof rollers 133 and 134 which seat upon the outer edges of conveyor plates 40 endwise outward from the posts and sleeves 67 and 68 which form the pepper holders.

It should be observed that the length of the arm 132 is such that the rollers 133 and 134 assume particular positions with regard to the teeth of the main drive gears 42. Each of the teeth of the drive gears have a squared portion 135 and a chain driving projection 136, as best seen the showing of FIG. 6. The chain driving projections 136 project inward between the links 62 of the conveyor sprocket chain 41, while the ends of these same links 62 seat down upon the squared portions 135 of the main drive gears 42. The spacing between the rollers 133 and 134 with respect to the spacing of the teeth of gears 42 is such that when roller 134 is disposed radially outwardly from one of the gear teeth, the roller 133 is disposed radially outward from a region between two of the gear teeth. Consequently, with roller 134 disposed above the gear tooth, the conveyor plates upon which it is disposed, shown as plates 40A and 40B in FIG. 6, are prevented from pivoting and the associated pepper holder posts 67 remain in pepper holding position.

The effect of this clamping action of the roller 134 on the plates 40A and 40B also extends to the adjacent conveyor plate 40C to maintain the pepper holding posts 67 mounted on plate 40C in that normal position. However, roller 133 is at this same time disposed over the facing edges of conveyor plates 40D and 40E and presses these plates downward into the space between the teeth of gears 42, causing the posts 67 mounted on conveyor plate 40D to pivot away from the posts 67 mounted on plate 40C and to thereby open the pocket which holds cored and sliced pepper 72A. Consequently, with the pepper holding pocket opened, pepper 72A falls outward and downward for collection and further processing as desired. As gears 42 continue to rotate, roller 133 will ride up onto the gear tooth between plates 40C and 40D while roller 134 will roll into the space between gear teeth and onto plates 40A and 40F, tilting the same and opening the pockets carrying peppers 72B and 72C. If peppers 72B and 72C are not discharged by the action of roller 134 they will be discharged when subsequently subjected to the action of roller 133.

As the gear 42 rotates during the operation of the apparatus, the arm 132 rocks about its pivot 131 allowing the rollers 133 and 134 to respectively alternately ride upward over the gear teeth and downward into the spaces between the teeth to thereby continuously flip open the pepper holding pockets as they pass the rocker arm structure. Proper positioning of the rollers 133 and 134 carried by the arm 130 is effected by adjustment of the support plate 129 along the threaded rods 128. This is accomplished by means of the adjusting nuts 137 through 140 which are threaded upon the rods 128 and which secure the support plate 129 in a given desired adjusted position.

Having now described the invention in connection with a particularly illustrated embodiment thereof, modifications and variations may now occur from time to time to those persons normally skilled in the art without departing from the essential scope or spirit of the invention, and accordingly it is intended to claim the same broadly as well as specifically as indicated by the appended claims.

What is claimed to be new and useful is:

1. A pepper coring and slicing apparatus comprising in combination,
   (a) pepper holding means for holding a pepper at a pepper coring station,
      (1) oriented with its stem up so that the pepper core is disposed along a vertical axis,
      (2) with the top exposed and a pair of completely exposed side regions extending from the top to the bottom of the pepper and on diametrically opposite sides of the pepper, and
      (3) with the bottom of the pepper extending between the said pair of side regions exposed,
   (b) vertically reciprocable pepper coring and slicing means comprising,
      (1) first coring and slicing means disposed above said pepper holding means including a hollow cylindrical corer disposed with its cylindrical axis vertical and having a cutting edge completely about its lower end, and a pair of spaced apart co-planer side cutting blades having linearly extending lower cutting edges extending radially outward from said corer from diametrically opposite sides of the latter and spaced downward at a lower elevation than the corer cutting edge, and
      (2) second slicing means disposed below said pepper holding means including a planer bottom cutting blade having a linearly extending upper cutting edge oriented substantially co-planerly with the said pair of upper spaced apart co-planer cutting blades, and
   (c) actuating means for vertically reciprocating said first and second coring and slicing means to cause
      (1) said first means to descend so that said corer cuts through the pepper top and cuts the core from the pepper, and said side cutting blades cut the top, sides and the outer parts of the bottom of the pepper, and
      (2) said second means to rise and cut the uncut bottom of the pepper between the cuts made by said first means side cutting blades, said actuating means thereafter retracting said first and second coring and slicing means out of engagement with the pepper.

2. Apparatus as described in claim 1 wherein the cutting length of said second slicing means is slightly less than the distance between said spaced apart co-planer side cutting blades of said first coring and slicing means.

3. Apparatus as described in claim 1 wherein said pepper holding means comprises an apertured underlying support onto which the bottom of the pepper is seatable, said apertured support exposing the bottom of the pepper transversely for a sufficient extent that the cutting edges of said first means side cutting blades and said second slicing means are enabled when actuated to pass completely through the wall of the bottom of the pepper.

4. Apparatus as described in claim 1 further including pepper core stripping means disposed partly within said hollow cylindrical corer effective when said actuating means retracts said corer to eject a pepper core retained in said corer and cause the core to be returned to the pepper for subsequent movement with the pepper.

5. Apparatus as described in claim 1 wherein said pepper holding means comprises an apertured underlying support onto which the bottom of the pepper is seatable, said apertured support exposing the bottom of the pepper transversely for a sufficient extent that the cutting edges of said first means side cutting blades and said second slicing means are enabled when actuated to pass completely through the wall of the bottom of the pepper, and a resilient pepper holding structure secured to and extending upward from said underlying support, said resilient structure being adapted to resiliently engage the opposite side regions of a pepper which are different from the exposed side regions of the pepper which are sliced by said first means side cutting blades.

6. Apparatus as described in claim 1 wherein said pepper holding means comprises,
   (a) a pair of adjacent co-planer underlying pepper support plates having a pair of facing adjacent edges contoured to provide an aperture therebetween over which the bottom of a pepper is disposable, said aperture exposing the bottom of a pepper transversely for a sufficient extent that the cutting edges of said first means side cutting blades and said second slicing means are enabled when actuated to pass completely through the bottom wall of the pepper, and
   (b) a resilient pepper holding structure, half of which is secured to and extends upward from each of said pair of coplaner pepper support plates and which conjointly form a complete pepper holding structure, said resilient pepper holding structure being adapted to resiliently engage the opposite side regions of a pepper which are different from the exposed side regions of the pepper which are sliced by said first means side cutting blades.

7. Apparatus as described in claim 5 or 6 including a cyclicly intermittently movable conveyor which carries said pepper holding means and which moves said pepper holding means from a pepper loading station to a processing station where the conveyor stops while the peppers are cored and sliced as aforesaid and then restarts and moves said pepper holding means to a discharge station where the peppers are released from said pepper holding means, and further including pepper discharge means at the pepper discharge station effective to retract said resilient pepper holding structure out of holding engagement with the processed pepper to thereby effect gravity discharge of the pepper from the pepper holding structure.

8. Apparatus as described in claim 7 further including safety means effective to prevent actuation of said actuating means while said conveyor is in motion.

9. Apparatus as described in claim 7 further including safety means effective to prevent restart of said conveyor unless said actuating means has completely retracted said first and second coring and slicing means.

10. Apparatus as described in claim 7 further including first safety means effective to prevent actuation of said actuating means while said conveyor is in motion, and second safety means effective to prevent restart of said conveyor unless said actuating means has completely retracted said first and second coring and slicing means.

11. Apparatus as described in claim 6 including a cyclicly intermittently movable conveyor which carries said pepper holding means and which moves said pepper holding means from a pepper loading station to a processing station where the conveyor stops while the peppers are cored and sliced as aforesaid and then restarts and moves said pepper holding means to a discharge station where the peppers are released from said pepper holding means, and further including pepper discharge means at the pepper discharge station effective to rotate at least one of said pair of adjacent co-planar pepper support plates with respect to the other in such direction as to rotate the half of said resilient pepper holding structure which is secured thereto away from the other half of said resilient pepper holding structure which is secured to the other of said pair of adjacent pepper support plates, thereby releasing the pepper from the said pepper holding structure.

12. Apparatus as described in claim 11 further including safety means effective to prevent actuation of said actuating means while said conveyor is in motion.

13. Apparatus as described in claim 11 further including safety means effective to prevent restart of said conveyor unless said actuating means has completely retracted said first and second coring and slicing means.

14. Apparatus as described in claim 11 further including first safety means effective to prevent actuation of said actuating means while said conveyor is in motion, and second safety means effective to prevent restart of said conveyor unless said actuating means has completely retracted said first and second coring and slicing means.

15. Apparatus as described in claim 11 wherein
(a) said conveyor is a chain conveyor including a pair of parallel spaced apart sprocket gears and a pair of spaced apart parallel endless sprocket chains trained thereabout to which are respectively secured the opposite ends of each of said pepper support plates, each said support plate being secured to chain links different from those to which each adjacent plate is secured, and
(b) said pepper discharge means comprises a pair of co-planar rollers spaced longitudinally along the conveyor chain and rotatably secured to opposite ends of a rocker arm, said rollers being seated for rolling engagement on the pepper holder side of said pepper support plates and said rocker arm being secured for rocking movement about an axis between said co-planar rollers, said rollers being spaced apart the proper distance so that when one roller is disposed radially outward of a sprocket gear tooth the other roller is disposed radially outward of the space between a pair of sprocket gear teeth.

16. Apparatus as described in claim 15 wherein said pepper discharge means includes two pairs of said co-planar rollers and rocker arm structures, one pair being positioned to lie radially outward from one of said sprocket gears and the other pair being positioned to lie radially outward from the other of said sprocket gears, corresponding rollers of said two pairs of rollers being simultaneously seatable on the opposite ends of the same pepper support plates.

17. Apparatus as described in claim 1, 3, 5 or 6 including a cyclicly intermittently movable conveyor which carries said pepper holding means and which moves said pepper holding means from a pepper loading station to a processing station where the conveyor stops while the peppers are cored and sliced as aforesaid and then restarts and moves said pepper holding means to a discharge station where the peppers are released from said pepper holding means.

18. Apparatus as described in claim 17 further including safety means effective to prevent actuation of said actuating means while said conveyor is in motion.

19. Apparatus as described in claim 17 further including safety means effective to prevent restart of said conveyor unless said actuating means has completely retracted said first and second coring and slicing means.

20. Apparatus as described in claim 17 further including first safety means effective to prevent actuation of said actuating means while said conveyor is in motion, and second safety means effective to prevent restart of said conveyor unless said actuating means has completely retracted said first and second coring and slicing means.

* * * * *